United States Patent Office 3,437,699
Patented Apr. 8, 1969

3,437,699
PHENOL PURIFICATION
Earl Dan Flickinger, El Dorado, Kans., assignor to Skelly Oil Company, Tulsa, Okla., a corporation of Delaware
No Drawing. Filed Nov. 19, 1965, Ser. No. 508,837
Int. Cl. C07c 37/22
U.S. Cl. 260—621                                6 Claims

ABSTRACT OF THE DISCLOSURE

Purification of phenol to render innocuous color-forming impurities therein by treating phenol with hydrogen in the presence of a hydrogenation catalyst.

---

The present invention relates to the purification of phenol and in particular to the purification of phenol produced from cumene.

The production of phenol by the oxidation of cumene and the decomposition of the resulting hydroperoxide is well known. It is likewise well known that phenol produced in this manner contains color-forming impurities which, when the phenol is subjected to chlorination and/or sulfonation, produces intensely colored derivatives. In many cases this intense color in chlorinated or sulfonated phenols is undesirable. A conspicuous example of undesired color formation is in the preparation of chlorinated phenols, such as pentachlorophenol which is used extensively for preserving wood, or in the preparation of tetrachlorophenol which is a general disinfectant and fungicide finding widespread use for preserving cellulosic products including paper, insulation board, wood and the like. Thus, it is frequently observed that when phenol manufactured by the cumene process is chlorinated to produce, for example, pentachlorophenol, the resulting product has an undesirable red color. The colored chlorophenol product cannot therefore be used satisfactorily in the preservation of those wood products where it is desired to retain their natural color. Similarly, where it is desired to prepare a clear resin product, for example by interaction of phenol and formaldehyde, undesirable color formation occurs with untreated phenol even in spite of the fact that phenol appears to be clear and free of undesirable color precursors. Similar problems are encountered when phenols are sulfonated for one purpose or another.

It is therefore a principal object of the present invention to provide a process whereby connate impurities which produce undesired color upon subsequent reaction of cumene-produced phenol can be inactivated or rendered innocuous.

It is a further object of the present invention to inactivate or render innocuous connate color-forming impurities in cumene-produced phenol by a highly convenient, relatively simple treating process.

In accordance with one embodiment of the present invention, the above objects are accomplished by subjecting the phenol produced from cumene to a mild hydrogenation treatment in the presence of active metal hydrogenation catalysts. The process is carried out conveniently by passing hydrogen and molten phenol, after separation from the other products produced during its manufacture, over a metal hydrogenation catalyst. Inasmuch as the undesired color-forming materials in the phenol can be inactivated or rendered innocuous using mild hydrogenation conditions, it is preferred to do so thereby avoiding the possibility of adversely affecting the phenol itself. While the hydrogenation conditions can vary widely and are not critical with respect to the desired objective, the hydrogenation is preferably carried out at a relatively low temperature above the melting point of phenol (40.8° C.) and preferably below 600° C. If desired, the phenol can, for processing convenience, be dissolved in a suitable solvent, such as xylene. In such event it is possible to employ even lower temperatures. Likewise, relatively low pressures are used for the hydrogenation and pressures ranging from atmospheric to 600 p.s.i.g. or higher can be suitably employed. The space velocity is not critical and can be varied for optimum processing economy. A space velocity of from about 1 to 2.5 v./v./hr. or higher can be employed satisfactorily. Sufficient hydrogen is employed to ensure that all of the connate color-forming materials in the phenol undergo hydrogenation. A large excess of hydrogen can be employed economically since the hydrogen can be recycled with very little loss of hydrogen. Thus, an excess of hydrogen such as 900–1500 more or less standard cubic feet per barrel of phenol is economically feasible. It is preferred to maintain the purity of the recycle hydrogen above 90%, particularly if the recycle stream includes hydrogen from other chemical processes such as are frequently carried out in the petroleum refining industry.

After the hydrogenation, the phenol can be merely collected and the hydrogen permitted to separate therefrom. Alternatively, if greater phenol purity is desired the phenol can be distilled after hydrogenation.

A variety of hydrogenation catalysts are known to the art which can be suitably employed in accordance with the present invention. Thus, representative hydrogenation catalysts are nickel-molybdenum, palladium, cobalt-molybdenum, and the like. The hydrogenation catalysts can be employed in a finely divided state or supported on a suitable base or carrier such as alumina, charcoal, silica-alumina, silica gel, kieselguhr and the like. A variety of suitable hydrogenation catalysts are commercially available and extensively employed in the petroleum refining industry. In some instances these commercial hydrogenation catalysts are distributed in the form of metal oxides in which event the catalysts are reduced prior to use in the present invention.

The following examples further illustrate the specific embodiments and advantages of the present invention.

In these examples comparisons were made between samples of untreated phenol and samples of phenol treated in accordance with the present invention when both samples were subjected to chlorination. In conducting the chlorination, 10 milliliters of phenol were placed in a test tube fitted with a fritted glass bubbler welded through a glass stopper and extending to the bottom of the test tube. A gas outlet connection was provided on the glass stopper. Chlorine gas was introduced into the test tube at a rate of 1 liter per minute while maintaining it at a temperature of 80° C. ±5° C. Chlorination was stopped when a gain in weight of 5.5–6.0 grams was noted which usually required 6.0–6.5 minutes. Within 30 minutes after chlorination, the chlorinated phenol was transferred to a Hellige Comparator Illuminator No. 600–DA employing color disc No. 620 S–10.

In the following examples, where the color of treated and untreated phenol samples were compared upon sulfonation, the sulfonation was carried out by placing 15.0±0.1 grams of phenol in a stoppered vessel and heating until molten. To the phenol was added 7.5±0.1 grams of concentrated sulfuric acid and the resulting mixture was heated with stirring to 150° C.±5° C. and held at that temperature for 5 minutes. The sulfonated phenol was then cooled and subjected to analysis by a Beckman Model B spectrophotometer at 585 millimicrons.

Example I

Samples of phenol produced by the decomposition of cumene hydroperoxide after separation from other decomposition products were chlorinated as indicated with and without prior treating with hydrogen. The chlorinated phenols which were not treated in accordance with the invention had a color of 15–20 on the Hellige disc 620 S–10 color scale.

Other samples of phenol were hydrogenated in accordance with the invention by continuously passing hydrogen and phenol at a space velocity of 1.1 v./v./hr. over a bed of a prereduced nickel-molybdenum hydrogenation catalyst having the following physical properties and chemical composition: (Prior to use the catalyst was reduced in a hydrogen atmosphere.)

Physical properties:
- Surface area, m.²/gm. _____ 200–300
- Pore volume, cc./gm. _____ 0.50–0.60
- Average pore diameter, A. _____ 100–120
- Apparent bulk density, lbs./cu. ft. _____ 30–40
- Side crush strength, lbs.:
  - 3/16" x 3/16" tablet _____ 25±5
  - 1/8" diameter extrusion _____ 20±5
  - 1/12" diameter extrusion _____ 15±3
  - 1/16" diameter extrusion _____ 10±2

Chemical composition:
- Nickel oxide, wt. percent NiO _____ 3.5–4.5
- Molybdenum oxide, wt. percent $MoO_3$ __ 13.0–15.0
- Sodium oxide, wt. percent $Na_2O$ _____ 0.05 max.
- Iron oxide, wt. percent $Fe_2O_3$ _____ 0.20 max.
- Chlorides, wt. percent _____ 0.10 max.

The pressure and temperature of the hydrogenations were varied as indicated in the following table which also indicates the color of the hydrogenated phenol samples upon chlorination.

| Sample No. | Pressure, p.s.i.g. | Average temperature, °C. | Chlorination color, Hellige Disc No. 620 S–10 |
|---|---|---|---|
| 1 | 300 | 156 | 4 |
| 2 | 300 | 182 | 2 |
| 3 | 300 | 210 | (¹) |
| 4 | 300 | 253 | (²) |
| 5 | 300 | 277 | (²) |
| 6 | 100 | 324 | 2 |

¹ Lighter than 2.
² Lighter than 0.

Example II

Phenol produced by decomposition of cumene hydroperoxide and of apparent clear color and having a chlorination color of darker than 20 on the Hellige scale, was hydrotreated over the same batch of nickel-molybdenum catalyst described in Example I but with the throughput rate doubled and the space velocity being increased to 2.2. Chlorination colors of the various runs at different operating conditions are tabulated below for the hydrotreated undistilled product.

| Sample No. | Pressure, p.s.i.g. | Average temperature, °C. | Chlorination color, Hellige Disc No. 620 S–10 |
|---|---|---|---|
| 7 | 500 | 133 | (¹) |
| 8 | 700 | 133 | 2 |
| 9 | 300 | 133 | 2 |
| 10 | 100 | 131 | 2 |
| 11 | 300 | 116 | 2 |
| 12 | 100 | 105 | 2 |

¹ Lighter than 2.

The dry melting point on samples Nos. 11 and 12 was the same as on the untreated phenol=40.8° C.

Example III

Phenol samples, after separation from the other products resulting from the decomposition of cumene hydroperoxide, were given the sulfonation test as described above. The untreated phenol was found to have a sulfonation color of 0.14 optical density at 585 mu. After hydrotreating the optical density of the sulfonated undistilled material was found to be 0.2219 at 585 mu. Distillation of the hydrotreated sample gave a product which on sulfonation had an optical density of 0.04 at 585 mu in a Beckman Model B spectrophotometer. The blank used in the spectrophotometer was a solution containing 1% by volume concentrated sulfuric acid, 30% Formula 3A ethyl alcohol, and 69% distilled water.

Example IV

Phenol produced by the decomposition of cumene hydroperoxide and of apparent clear color and having a chlorination color of 15–20 on the Hellige color scale was hydrotreated over a hydrogenation catalyst comprising 0.5 percent by weight palladium on an active extruded alumina base. Space velocity was 2.2. Chlorination color for the hydrotreated undistilled product was as shown.

Sample _____ No. 13
Pressure p.s.i.g. _____ 45
Average temperature, ° C. _____ 79
Chlorination color Hellige Disc No. 620 S–10 _____ 6

Example V

Phenol produced by the decomposition of cumene hydroperoxide and of apparent clear color was hydrogenated over a cobalt-molybdenum hydrogenation catalyst of the following analysis:

- Ignition loss _____ 2.0% max.
- CoO _____ 3.0–4.0%.
- Ni _____ 0.0%.
- $MoO_3$ _____ 14.5–16.0%.
- Fe _____ 0.05% max.
- $Na_2O$ _____ 0.04% max.
- Average diameter _____ 0.10–0.15 inch.
- Density _____ 31–36 pounds/cu. ft.
- Catalytic alumina base.

Space velocity was 2.2. Chlorination color for the hydrotreated, undistilled product is shown in the table:

| Sample No. | Pressure, p.s.i.g. | Average temperature, °C. | Chlorination color, Hellige Disc No. 620 S–10 |
|---|---|---|---|
| No. 14 | 600 | 224 | (¹) |
| No. 15 | 620 | 181 | 2 |

¹ Lighter than 2.

Example VI

Phenol produced by the cumene process and of apparent clear color and having a chlorination color of darker than 20 on the Hellige disc 620 S–10 color scale, was hydrotreated over a nickel-molybdenum hydrogenation catalyst. Chlorination colors of the various runs at different operating conditions are tabulated below for the hydrogenated undistilled product. Space velocity was 2.2.

| Sample No. | Pressure, p.s.i.g. | Average temperature, °C. | Chlorination color, Hellige Disc No. 620 S–10 |
|---|---|---|---|
| 16 | 100 | 106 | 1 |
| 17 | 50 | 172 | 1 |
| 18 | 45 | 231 | 1 |
| 19 | 90 | 90 | (¹) |
| 20 | 45 | 90 | 1 |

¹ Lighter than 2.

The advantages of the invention are readily apparent from the above examples which are merely illustrative. Therefore, those modifications and equivalents which fall within the spirit of the invention and the scope of the appended claims are to be considered part of the invention.

I claim:

1. A process for the purification of phenol produced by the decomposition of cumene hydroperoxide and containing impurities which give rise to color formation on chlorination or sulfonation which comprises separating a stream consisting essentially of the phenol and said impurities from other products resulting from the said decomposition, contacting said stream at a temperature above the melting point of phenol but below 600° C. with hydrogen in the presence of a metal hydrogenation catalyst selected from the group consisting of nickel-molybdenum, palladium and cobalt-molybdenum and recovering the so-treated phenol in which color-forming impurities have been inactivated.

2. The process as claimed in claim 1 wherein after treating with hydrogen in the presence of said metal hydrogenation catalyst the phenol is distilled to further purify the same.

3. A process as claimed in claim 1 wherein a nickel-molybdenum hydrogenation catalyst is employed.

4. A process as claimed in claim 1 wherein a palladium hydrogenation catalyst is employed.

5. A process as claimed in claim 1 wherein a cobalt-molybdenum hydrogenation catalyst is employed.

6. A process for the purification of phenol produced by the decomposition of cumene hydroperoxide and containing impurities which give rise to color formation on chlorination or sulfonation which comprises separating a stream consisting essentially of the phenol and said impurities from other products resulting from the said decomposition, dissolving said stream in a solvent therefore and contacting the resulting solution with hydrogen at a temperature below 600° C. in the presence of a metal hydrogenation catalyst selected from the group consisting of nickel-molybdenum, palladium and cobalt-molybdenum and recovering the so-treated phenol in which color-forming impurities have been inactivated.

References Cited

UNITED STATES PATENTS

| | | |
|---|---|---|
| 2,971,893 | 2/1961 | Hood. |
| 3,205,272 | 9/1965 | Pollitzer. |
| 3,187,052 | 6/1965 | Nelson et al. |

FOREIGN PATENTS 166,709  3/1965  U.S.S.R.

LEON ZITVER, *Primary Examiner.*

H. ROBERTS, *Assistant Examiner.*

U.S. Cl. X.R.

260—512, 623